United States Patent [19]
Butler

[11] Patent Number: 4,577,405
[45] Date of Patent: Mar. 25, 1986

[54] COMPOUND-ANGLE BLADE FOR STRIPPING INSULATED ELECTRICAL CONDUCTORS

[75] Inventor: John D. Butler, New Berlin, Wis.

[73] Assignee: Mechtrix Corporation, Wauwatosa, Wis.

[21] Appl. No.: 651,830

[22] Filed: Sep. 17, 1984

[51] Int. Cl.[4] .............................................. H02G 1/12
[52] U.S. Cl. ........................................ 30/90.1; 81/9.4
[58] Field of Search ............................ 30/90.1; 7/107; 81/9.5 R, 9.5 A, 9.51, 9.4, 9.42, 9.43, 9.44

[56] References Cited

U.S. PATENT DOCUMENTS

| | | | |
|---|---|---|---|
| 1,260,642 | 3/1918 | Chia | 7/107 X |
| 2,133,005 | 10/1938 | Wollenweber | 30/90.1 |
| 2,660,783 | 12/1953 | Davis | 81/9.5 R |
| 3,881,248 | 5/1975 | Kaufman | 30/90.1 |
| 4,250,772 | 2/1981 | Graber | 81/9.51 |

Primary Examiner—Jimmy C. Peters
Attorney, Agent, or Firm—Fuller, House & Hohenfeldt

[57] ABSTRACT

A blade for cutting and stripping insulation from insulated electrical conductors has two blade angles leading to the cutting edge. The first angle is a gathering angle which opens onto the leading surface of the blade and provides a wide opening for gathering offset insulated conductors. The gathering angle converges toward the interior of the blade and intersects the second blade angle, which also converges toward the blade interior. The second blade angle, the cutting angle, terminates in a radius cutting edge adapted to slice the insulation. The blade walls defining the cutting angle are tangent to the cutting edge radius. The cutting angle is minimized so that the radius cutting edge provides a maximum circumferential contact with the conductor. The blade may include a stop for positively controlling the cutting stroke to avoid nicking the conductor.

9 Claims, 10 Drawing Figures

COMPOUND-ANGLE BLADE FOR STRIPPING INSULATED ELECTRICAL CONDUCTORS

BACKGROUND OF THE INVENTION

1. Field of the Invention

This invention pertains to cutting apparatus, and more particularly to apparatus for cutting and stripping insulation from insulated electrical conductors. 2. Description of the Prior Art Industry utilizes two basic types of cutting blades for high production stripping of insulation from insulated electrical conductors, the die type and the V type. In the die type design, FIGS. 1a and 1b, a pair of knife blades 1 form two halves of a counterbored hole 2 and a smaller through hole 4. The two blades 1 are closed over the insulation 3 of a specifically sized insulated conductor 5 at the desired location thereon. The die type design possesses the advantages of closely conforming to the configuration of the conductor 7 around the full periphery thereof and of having a depth of cut controlled by the contacting of leading edges 9 to prevent nicking and scoring the conductor. Nicking a conductor is undesirable because nicks decrease the electrical current carrying capacity, and they produce stress concentrations which decrease the tensile strength of the conductor. However, die type blades suffer from three disadvantages. The first is that a pair of die blades is designed to be used with only one size of insulated conductor. Secondly, the squeezing of the insulation 3 between the conductor 7 and the blades 1 may prevent the blades from fully closing onto the conductor. The insulation is then not completely cut through to the conductor. Rather, some of the insulation is squeezed in the area 11 between the leading edges 9 and the conductor. As a result, the uncut insulation must be torn from the parent insulation. The third disadvantage is that die type blades have only a low tolerance for accommodating off-center insulated conductors transported between the open blades. In many applications, special wire guides in the form of mechanical fingers are required to ensure the insulated conductor is on the center line of the closed blades.

Referring to FIGS. 2a and 2b, a pair of conventional V type blades 13 are shown. Each blade 13 is manufactured with a sharp edged cutting radius 15 at the bottom of the V 17 for slicing through the insulation 3. The cutting radius 15 is ideally equal to one-half of the outer diameter of the conductor to be stripped, but a single pair of V type blades can cut and strip several sizes of insulated conductor. Another advantage of the V type blade design is that the sharp knife edges slice through the insulation to the conductor rather than squeezing the insulation. On the other hand, conventional V type designs lack positive stroke control; therefore the conductor 7 is prone to be nicked and scored when stripped.

Conventional V type blades are capable of gathering off-set insulated conductors 5 to the cutting edge 15 because of the V-shaped path 17 in each blade. The narrow end of the V path 17 is tangent to the cutting radius 15. The edges 19 which define the path 17 diverge from the radius cutting edge 15 at a blade angle D. It is apparent that a large angle D is desirable so as to gather greatly off-set insulated conductors. However, because of the angle D, the cutting radii 15 do not form a full circle around the conductor 7 when the blades 13 are closed, as shown in FIG. 3. Instead, a small amount of insulation thickness t and corresponding tear area a remain uncut. The insulation area a must be torn from the parent insulation during the stripping operation. The physical characteristics of some insulation materials make them difficult to tear, so it is desirable to minimize thickness t and area a.

It will be appreciated that insulation tear thickness t and area a would be eliminated if angle D were zero degrees. That ideal is not attainable in industrial practice because of insulated conductor size variations and inherent limitations on the cutting and stripping machines employing the stripping blades. Further, if the blade edges 17 were parallel, the blades would not tolerate off-center insulated conductors any better than die type blades, and they would be able to process only a single size insulated conductor. Thus, conventional stripping blades must compromise between a wide V for gathering ability and a narrow V for minimizing the amount of insulation remaining uncut.

The mathematical relationship between the roundness of the blade cutting edge and the blade angle D is expressed in terms of the percent circumferential contact between the blade cutting radius 15 and the conductor 7 periphery. The percent circumferential contact is defined as $$C = \left(1 - \frac{D}{180}\right) \times 100\%.$$

The percent circumferential contact is independent of the size of the radius 15 and is affected only by blade angle D. Experimentation has shown that C should be at least 75% for efficient cutting and stripping. However, industrial standards for percent circumferential contact range as low as about 64% for a conductor diameter of 0.03125 inches and a blade angle D of about 60°, as shown by Table 1.

TABLE 1

| CONDUCTOR DIAMETER | BLADE CUTTING EDGE RADIUS | GATHERING ANGLE D | CIRCUMFERENTIAL % CONTACT C |
|---|---|---|---|
| 0.03125" | 0.01562" | 60–64° | 64.4–66.7% |
| 0.06250 | 0.03125 | 58–62 | 65.6–67.8 |
| 0.09375 | 0.04687 | 54–60 | 66.7–70.0 |
| 0.12500 | 0.06250 | 48–52 | 71.1–73.3 |
| 0.15625 | 0.07812 | 44–50 | 72.2–75.6 |
| 0.18750 | 0.09375 | 38–42 | 76.7–78.9 |
| 0.25000 | 0.12500 | 30–34 | 81.1–83.3 |

SUMMARY OF THE INVENTION

In accordance with the present invention, blades for cutting and stripping insulation from insulated electrical conductors are provided which are capable of gathering greatly off-set insulated conductors while maximizing the circumferential contact between the blades and the conductor. This is accomplished by apparatus which includes a pair of angled paths leading to the blade cutting blade.

The angled paths of each blade are arranged such that that the walls of both paths diverge outwardly from the blade cutting edge. The path walls at the narrow end of the first divergent path are tangent to a circular cutting edge, and the included angle between the path edges is relatively small. Thus, the blade cutting edge approaches a semi-circular shape. The walls of the second divergent path blend at the narrow end thereof into the walls of the wide end of the first path. The included angle between the walls of the second path is relatively great. The wide end of the second path terminates at the leading surface of the stripper blade, that is, the blade surface which is nearest the insulated conductor before the blades are closed to cut and strip the insulation. The opening of the second angled path is wide enough to gather insulated conductors at relatively great off-sets from the blade cutting edge center line.

Further in accordance with the present invention, the compound angled cutting blades may include stop means which positively limit the cutting stroke to the distance required for properly slicing the insulation without contacting the conductor. Thus, the present invention incorporates the non-nicking benefit of the die type blade design with the increased gathering and insulation slicing abilities of the V type design.

Other objects and advantages of the invention will become apparent to those skilled in the art from the disclosure.

BRIEF DESCRIPTION OF THE DRAWINGS

FIG. 2b is an enlarged cross-sectional view of the insulation of an insulated conductor being cut by the pair of V type blades of FIG. 2a;

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 4:
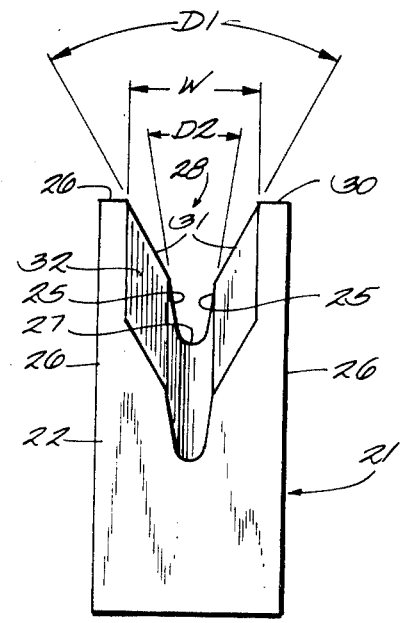
FIG. 4 is a front view of a V type blade according to the present invention.

Referring to FIG. 4, a blade 21 for transversely cutting generally cylindrical bodies is illustrated which includes the present invention. The cutting blade is particularly useful for cutting and stripping insulation from insulated electrical conductors, but it will be understood that the invention is not limited to electrical applications. It will be further understood that the blade of the present invention is generally used in pairs.

The blade 21 solves the long standing problem of combining a wide gathering opening W with a large amount of conductor circumferential contact. In the preferred embodiment, the blade is manufactured as a rectangular parallelopiped having faces 22 and 24 and side surfaces 26. The blade is formed with an opening 28 extending from blade leading surface 30 and extending toward the interior of the parallelopiped.

In accordance with the present invention, the opening 28 is formed with two blade angles, a gathering angle D1 and a cutting angle D2. Cutting angle D2 corresponds to a V-shaped path 23 defined by walls 25 which are tangent to cutting edge radius 27. Gathering angle D1 corresponds to a V-shaped path 29 defined by walls 31. In the illustrated construction, sloping surface 32 curves around the opening 28 and connects the faces 22 and 24. Consequently, the walls 5 and 31 are sharp edges created by the junction of curved sloping surface 32 and face 24. The transition points 33 between corresponding edges 25 and 31 may be blended into a smooth contour. The wide end of path 29 opens onto the leading surface 30 of the blade to create a wide length W for gathering an off-set insulated conductor, not shown in FIG. 4. It is anticipated that gathering length W will remain substantially equal to lengths presently in commercial use, because those lengths are industrial standards.

It has been discovered that a cutting angle D2 of about 36 degrees is preferred for all size radii 27. That angle is less than almost all the angles D of conventional blades, Table 1. The 36 degrees angle provides a percent circumferential contact of 80% for all insulated conductor diameters according to the relationship $$C = \left(1 - \frac{D}{180}\right) \times 100\%,$$

as shown in Table 2.

TABLE 2

| CON-<br>DUCTOR<br>DIAM-<br>ETER (IN.) | BLADE<br>CUTTING<br>EDGE DIAM-<br>ETER (IN.) | CUT-<br>TING<br>ANGLE<br>D2 | % CIRCUM-<br>FERENTIAL<br>CONTACT C |
|---|---|---|---|
| .03125 | .03125 | 36 | 80 |
| .0625 | .0625 | 36 | 80 |
| .09375 | .09375 | 36 | 80 |
| .125 | .125 | 36 | 80 |
| .15625 | .15625 | 36 | 80 |
| .1875 | .1875 | 36 | 80 |

Figure 3:
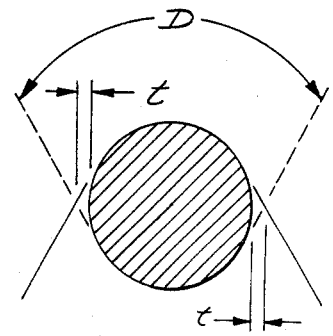
FIG. 3 is an enlarged view of the cutting radii of a pair of V type blades closed around an insulated conductor.
Figure 5:
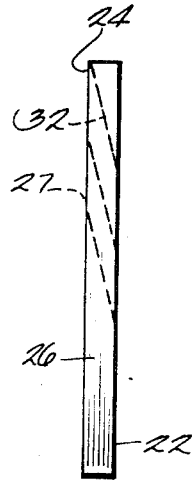
FIG. 5 is a side view of the cutting blade of FIG. 4.

The benefit obtained by the decreased cutting angle D2 of the present invention is illustrated in Table 3. The important observation to be made in Table 3 is that for each size insulated conductor, the tear thickness t (FIG. 3) using the present invention is only about one-third of that using conventional blades. Even more significant, the tear area a of uncut insulation is reduced to only about one-fifth of the area remaining when the insulation is cut by conventional blades. A minimum area a is highly desirable because the influence of insulation composition on strippability is then decreased.

TABLE 3

| | BLADE<br>DIA.<br>(IN.) | CON-<br>DUC-<br>TOR<br>DIA.<br>(in.) | TEAR<br>THICK<br>'t' (in.) | TEAR<br>AREA<br>(sq. in.) |
|---|---|---|---|---|
| CONVENTIONAL | 0.03125 | 0.03125 | 0.00241720 | 0.00002625 |
| INVENTION | 0.03125 | 0.03125 | 0.00080410 | 0.00000525 |

TABLE 3-continued

|  | BLADE DIA. (IN.) | CONDUCTOR DIA. (in.) | TEAR THICK 't' (in.) | TEAR AREA (sq. in.) |
| --- | --- | --- | --- | --- |
| CONVENTIONAL | 0.0625 | 0.0625 | 0.00483440 | 0.00010498 |
| INVENTION | 0.0625 | 0.0625 | 0.00160819 | 0.00002102 |
| CONVENTIONAL | 0.09375 | 0.09375 | 0.00725160 | 0.00023621 |
| INVENTION | 0.09375 | 0.09375 | 0.00241229 | 0.00004729 |
| CONVENTIONAL | 0.125 | 0.125 | 0.00966880 | 0.00041994 |
| INVENTION | 0.125 | 0.125 | 0.00321639 | 0.00008407 |
| CONVENTIONAL | 0.15625 | 0.15625 | 0.01208600 | 0.00065615 |
| INVENTION | 0.15625 | 0.15625 | 0.00402048 | 0.00013135 |

Figure 6:
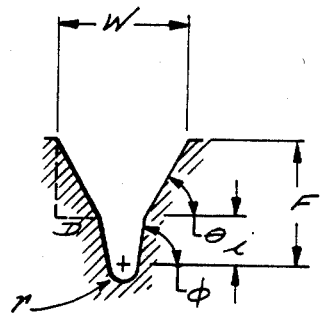
FIG. 6 is an enlarged view of the outline of the insulated conductor gathering and cutting edges of the cutting blade of the present invention.

The process for designing an insulation cutting and stripping blade according to the present invention will be explained in connection with FIGS. 4 and 6. A cutting angle D2 of 36 degrees has been determined to be optimum for all size insulated conductors. Gathering length W is matched to the existing industrial standard for a particular size insulated conductor. Gathering angle D1 is calculated according to the mathematical formula $$2\left(\frac{F-i}{TAN\theta}\right) + 2\left(\frac{i}{TAN\phi}\right) + 2\left(\frac{r}{COS(90-\phi)}\right) - W = 0$$

where all the angles are given in degrees and, $$\phi = \frac{180 - D2}{2}$$

$$\theta = ARCTAN\left(\frac{F-i}{P}\right) = \frac{180 - D1}{2}$$

F=(overall length of blade)—distance from centerline of conductor to bottom of blade
r=radius of blade=½ optimum conductor diameter. In other words, once the desired percent circumferential contact is specified, corresponding cutting angle D2 becomes fixed. Then, since the gathering length W is known, gathering angle D1 may be calculated. Dimension i of FIG. 6 is designed to be sufficient to assure the insulated conductor is fully centered along the center line of the blades before they are fully closed.

Figure 1B:
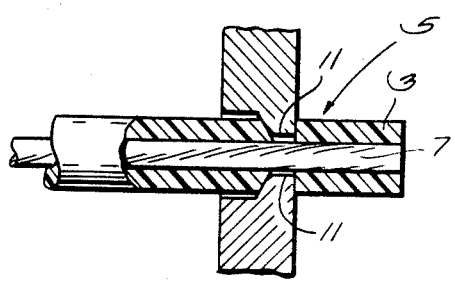
FIG. 1b is a cross-sectional view of the die type cutting blades of FIG. 1a in the closed position for cutting the insulation of an insulated conductor prior to stripping.
Figure 1A:
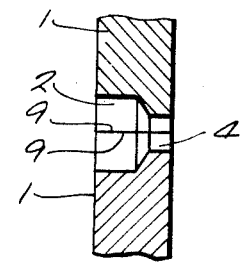
FIG. 1a is a cross-sectional view of a pair of conventional die type blades for cutting and stripping insulation from insulated electrical conductors.
Figure 2A:
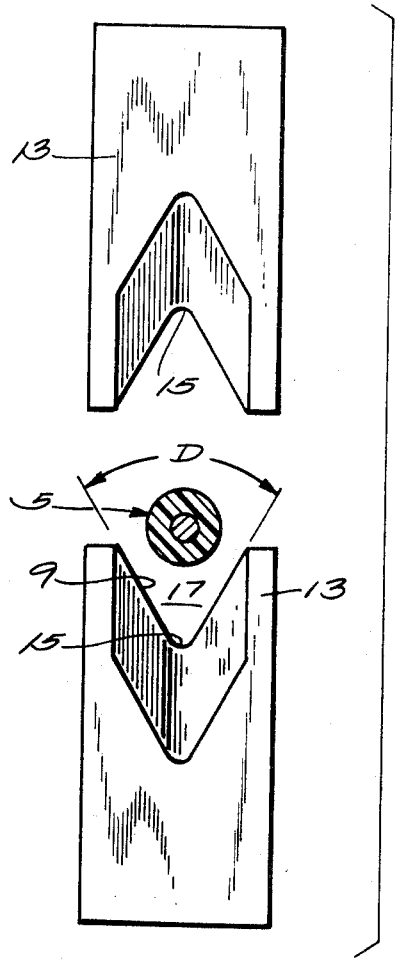
FIG. 2a is a front view of a pair of conventional V type blades for cutting and stripping insulation.
Figure 2B:
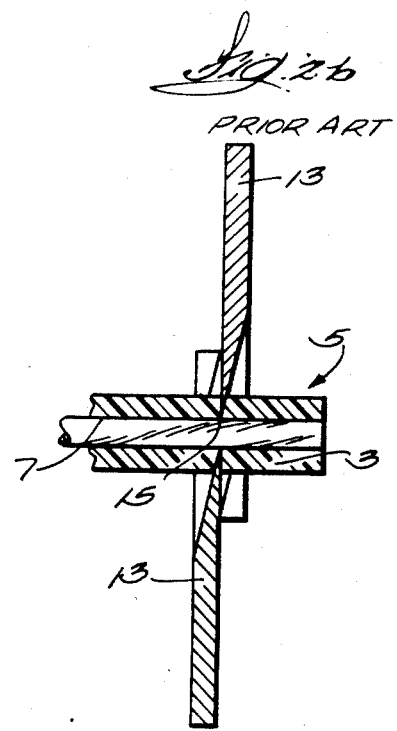
Figure 7:
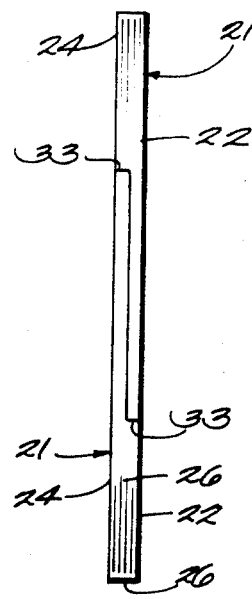
FIG. 7 is a side view of the compound angled cutting blade of the present invention adapted for positive stroke control.
Figure 8:
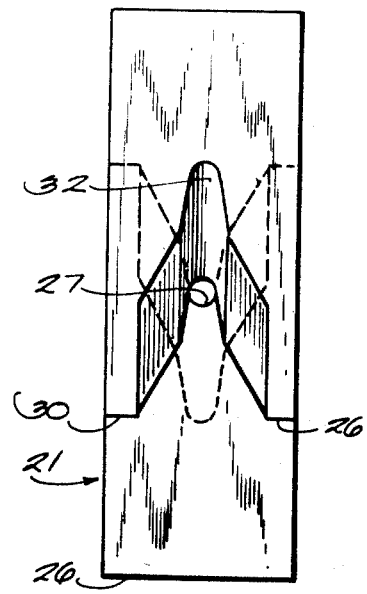
FIG. 8 is a front view of the compound angled cutting blade of FIG. 7.

Further in accordance with the present invention, the blades 21 may be fabricated with built in positive stops. The stops may be of the form of steps 33 machined into blade faces 24, FIGS. 7 and 8 or separate machine blocks as shown in FIG. 4. The stops offer the advantage of positive depth control which eliminates the possibility of nicking or scoring the conductor 7. This advantage heretofore has usually been available only with the die type blade design, FIGS. 1a and 1b. Consequently, the compound angled blade of the present invention incorporates the positive cutting depth control of die type blades and the wide gathering length of the V type design while reducing the insulation tear thickness and area.

Thus, it is apparent that there has been provided, in accordance with the invention, a compound angle blade for stripping insulated electrical conductors which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A blade for cutting and stripping insulation from insulated electrical conductors comprising a member formed as a rectangular parallelopiped having first and second faces and surfaces connecting the faces, one of the surfaces being formed with an opening extending between the faces and extending at a compound angle toward the interior of the member, the angled opening being defined by a first pair of walls converging at a first angle toward the interior of the member and a second pair of walls intersecting the first pair of walls and converging at a second non-parallel angle greater than 0 degrees but less than 54 degrees toward the interior of the member to accommodate different size conductors, the opening terminating in a radius cutting edge adapted to partially encircle a round conductor to cut the insulation, the second pair of angled walls being tangent to the cutting edge,
so that an insulated conductor is gathered into the opening between the first pair of walls and guided to the cutting edge along the second pair of walls.

2. The blade of claim 1 wherein the angle of convergence of the second pair of angled walls is about 36 degrees.

3. The blade of claim 1 wherein the first angle is calculated according to the formula $$2\left(\frac{F-i}{TAN\theta}\right) + 2\left(\frac{i}{TAN\phi}\right) + 2\left(\frac{r}{COS(90-\phi)}\right) - W = 0$$

where all the angles are given in degrees and, $$\phi = \frac{180 - D2}{2}$$

$$\theta = ARCTAN\left(\frac{F-i}{P}\right)$$

F=(overall length of blade—distance from centerline of conductor to bottom of blade
r=radius of blade =½ optimum conductor diameter
i=distance from the centerline of the conductor to the intersection of the first and second pairs of walls
P=½ the difference between the width of the opening in the surface formed with the opening and the width of the opening between the walls at the intersection of the first and second pairs of walls
D2=the second angle
W=width of opening between the first pair of walls in the surface formed with the opening.

4. An apparatus for cutting and stripping insulation from various sizes of insulated electrical conductors, a pair of blades mounted for reciprocation toward and away from each other, each blade being formed as a rectangular parallelopiped having first and second faces and surfaces connecting the faces, one of the surfaces being formed with an opening extending between the faces for receiving an insulated electrical conductor therethrough and extending at a compound angle toward the interior of the blade, the angled opening being defined by a first pair of walls converging at a first angle toward the interior of the blade and a second pair of walls intersecting the first pair of walls and converting at a non-parallel second angle of less than 54 degrees toward the interior of the blade and being tangent to and terminating in a radius cutting edge for cutting the insulation, so that when the blades reciprocate toward each other the radius cutting edges thereof close over the insulated electrical conductor and create a nearly circular opening for passage of the conductor therethrough to thereby permit cutting the insulation of various sizes insulated electrical conductors while leaving a minimum of uncut insulation to be torn from the parent insulation.

5. The apparatus of claim 4 wherein the angle of convergence of the second pair of angled walls of each cutting blade is about 36 degrees.

6. The apparatus of claim 4 wherein the diameter of the radius of the cutting edge of each cutting blade is between about 0.031 inches and 0.1875 inches.

7. The apparatus of claim 4 wherein the nearly circular opening through the closed cutting blades provides a percent circumferential contact between the blades' radius cutting edges and the conductor periphery of about 80% and wherein the percent circumferential contact is calculated according to the formula $$C = \left(1 - \frac{D}{180}\right) \times 100\%,$$

where D is the second blade angle.

8. The apparatus of claim 12 wherein the first angle of each cutting blade is calculated according to the formula $$2\left(\frac{F-i}{\text{TAN}\theta}\right) + 2\left(\frac{i}{\text{TAN}\phi}\right) + 2\left(\frac{r}{\text{COS}(90-\phi)}\right) - W = 0$$

where all the angles are given in degrees and, $$\phi = \frac{180 - D2}{2}$$

$$\theta = \text{ARCTAN}\left(\frac{F-i}{P}\right)$$

F = (overall length of blade—distance from centerline of conductor to bottom of blade
  = radius of blade = ½ optimum conductor diameter
i = distance from the centerline of the conductor to the intersection of the first and second pairs of walls
P = ½ the difference between the width of the opening in the surface formed with the opening and the width of the opening between the walls at the intersection of the first and second pairs of walls
D2 = the second angle
W = width of opening between the first pair of walls in the surface formed with the opening.

9. The apparatus of claim 5 wherein the blades are reciprocated to close the radius cutting edges thereof over more than one size insulated electrical conductor to cut the insulation thereof without contacting the conductor, so that a pair of blades having fixed radius cutting edges may be employed to cut various sizes of insulated electrical conductors with a minimum amount of insulation remaining uncut for tearing from the parent insulation.

* * * * *